United States Patent [19]

Nilsson

[11] Patent Number: 4,536,097

[45] Date of Patent: Aug. 20, 1985

[54] PIEZOELECTRICALLY OPERATED PRINT HEAD WITH CHANNEL MATRIX AND METHOD OF MANUFACTURE

[75] Inventor: Kenth Nilsson, Akersberga, Sweden

[73] Assignee: Siemens Aktiengesellschaft, Berlin & Munich, Fed. Rep. of Germany

[21] Appl. No.: 580,021

[22] Filed: Feb. 14, 1984

[30] Foreign Application Priority Data

Feb. 22, 1983 [DE] Fed. Rep. of Germany ....... 3306098

[51] Int. Cl.$^3$ .......................... B41J 3/04; G01D 15/18

[52] U.S. Cl. ...................................... 400/126; 346/75; 29/592 E

[58] Field of Search ............. 400/126; 346/75, 140 R; 29/592 E

[56] References Cited

U.S. PATENT DOCUMENTS

| | | | |
|---|---|---|---|
| 4,002,230 | 1/1977 | Schweppe et al. | 400/126 |
| 4,016,571 | 4/1977 | Yamada | 346/75 |
| 4,072,959 | 4/1976 | Elmqvist | 346/140 R |
| 4,158,847 | 4/1978 | Heinzl et al. | 346/140 R |
| 4,272,200 | 6/1981 | Hehl | 400/126 X |
| 4,303,927 | 12/1981 | Tsao | 346/75 |
| 4,308,546 | 12/1981 | Halasz | 346/75 |
| 4,354,194 | 10/1982 | Barteck | 346/75 |
| 4,370,663 | 1/1983 | Markham | 346/75 |
| 4,377,814 | 3/1983 | DeBesis | 346/75 |
| 4,385,304 | 5/1983 | Swiderman | 346/75 X |
| 4,449,134 | 5/1984 | Skinner, Jr. | 346/75 |

FOREIGN PATENT DOCUMENTS

| | | | |
|---|---|---|---|
| 57594 | 8/1982 | European Pat. Off. | 346/140 R |
| 2361781 | 6/1975 | Fed. Rep. of Germany | 346/140 R |
| 72965 | 6/1981 | Japan | 346/75 |
| 2072099 | 9/1981 | United Kingdom | 346/75 |
| 2098134 | 5/1982 | United Kingdom | 346/140 R |

*Primary Examiner*—E. H. Eickholt

*Attorney, Agent, or Firm*—Hill, Van Santen, Steadman & Simpson

[57] ABSTRACT

A mechanically stable, piezoelectric print head for an ink jet printer has ink channels formed by a channel matrix that consists of a row of piezoelectric strips disposed in spaced parallel relation next to one another, covered by a plate on both sides. The channels thus formed directly institute the printing nozzles.

12 Claims, 8 Drawing Figures

FIG 4
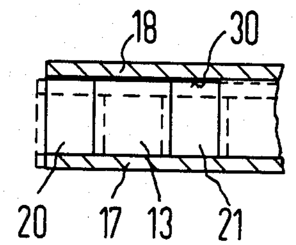
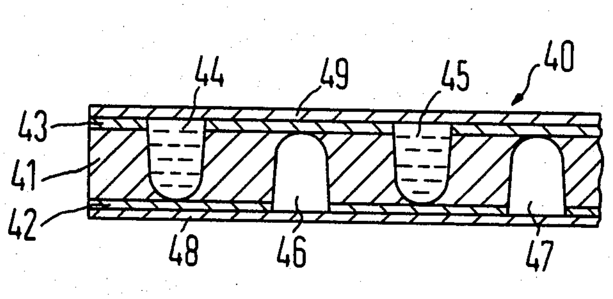
FIG 5
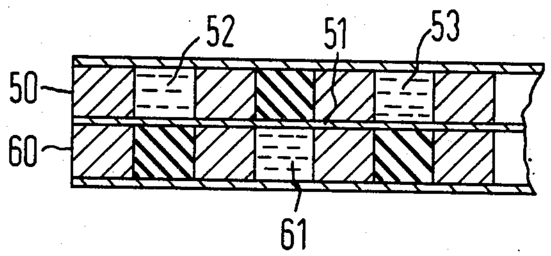
FIG 6
FIG 7
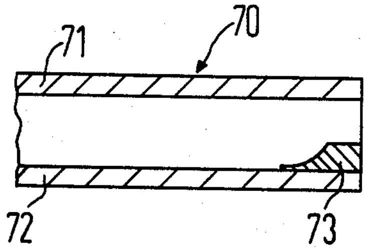
FIG 8
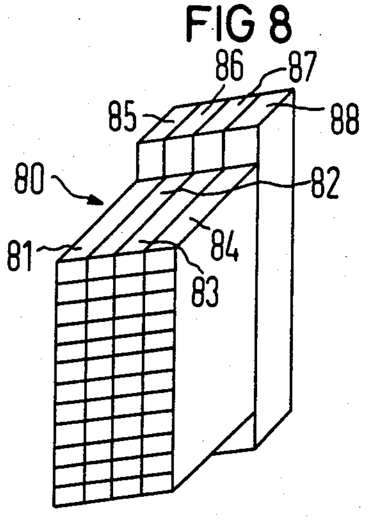

PIEZOELECTRICALLY OPERATED PRINT HEAD WITH CHANNEL MATRIX AND METHOD OF MANUFACTURE

BACKGROUND

1. Field of the Invention

The present invention relates to a print head for a dot matrix printer, and more particularly to such a print head having piezoelectric means for ejecting ink on a drop-by-drop basis.

2. The Prior Art

In the past, ink-jet dot matrix printers have consisted of two types. In one type, the print head consisted of a hole matrix having a series of nozzles with bar or rod-shaped piezoelectric elements arranged such that when the piezoelectric elements flex in response to an applied voltage, ink or writing fluid is ejected from a nozzle on a drop-by-drop basis. Such a system is illustrated in U.S. Pat. No. 4,072,959. In order to attain a high recording quality, the individual piezoelectric elements are united to form a type of comb and are thus connected to each other over a shared web. Relatively high tolerances are required in this kind of a structure, relative to the manufacture of the comb as well as the hole matrix, in order to obtain correct operation of the print head. For the same reason, the hole matrix and the comb must be carefully adjusted.

A second type of print head consists of a single work-piece made of a dielectric synthetic in a casting process, in which the work-piece contains a plurality of channels for conducting the writing fluid. Such a system is shown in U.S. Pat. No. 4,158,847. These channels lead to a hole matrix at the side toward the recording medium. The piezoelectric drive elements take the form of small ceramic tubes that cylindrically embrace the ink channels. In order to maintain a close spacing of the discharge openings, the ink channels radiate away from these discharge openings and the piezoelectric ceramic tubes are spaced from the discharge openings. Such a print head is relatively difficult to manufacture, and also has a relatively high mass so that correspondingly high accelerating forces are required for rapid movement of the print head.

BRIEF DESCRIPTION OF THE INVENTION

A principal object of the present invention is to provide a mechanically stable print head, and also to simplify significantly its manufacture.

Another object of the present invention is to provide such a print head with a mass as low as possible.

In one embodiment of the present invention, the above objects are achieved by forming the ink channels as a channel matrix consisting of a series of strips of piezoelectric material disposed in spaced parallel relationship to each other. Such piezoelectric materials are electrically contacted at both sides and are also covered on opposite sides by plates, to form closed channels. In one arrangement, the strips are formed by cutting grooves in a solid plate of piezoelectric material, so that one side only need be covered to form the channel matrix. The remainder of the plate encloses three sides of each channel. Rectangular channels for the ink are created between strips of piezoelectric material in this manner. When a voltage is applied to two strips of piezoelectric material, then they become narrower and higher so that the enclosed cross-sectional area of the channel is enlarged. Additional writing fluid is thereby sucked into the channel. When the exciting voltage is removed, the strips return to their original shape, thereby suddenly reducing the channel volume and ejecting the writing fluid.

The dimensions of the strips and clearances can advantageously be selected such that the channels formed between the strips directly form the writing nozzles. In this way a separate hole matrix can be eliminated, making unnecessary the difficult adjustment between the hole matrix and the piezoelectric comb, or between the hole matrix and the workpiece with the ink channels.

The present invention results in a sandwich structure, having a channel matrix which is mechannically rugged but nonetheless small and light so that a high excursion speed of the print head is possible with relatively small forces. Although it may seem, on a casual inspection, that the fluid contained in the channels may be ejected in both opposite directions, tests have shown there is a preferred ejection in the direction toward a recording medium in front of the print head. Since the ink channels are directly connected at their rear ends to a reservoir for writing fluid, the sudden change in cross-section causes a reflection of the fluid wave traveling toward the reservoir, so that the major part of the displaced fluid is ejected in the direction toward the recording medium.

In order to prevent the deformations of an activated channel from being coupled into an adjacent channel, a further development of the invention provides that every second channel is provided for writing fluid, with the intervening channels being filled with an elastic material or with air. In this way, practically no mechanical coupling is obtained between adjacent channels. At least one end of the air filled channels is preferably closed.

When the strips of piezoelectric material are rigidly connected to a carrier plate, the carrier plate is advantageously kept relatively thin so that the longitudinal distention of the piezoelectric strips does not bring about a bending of the carrier plate and, thus, the bending of the overall channel matrix. In one arrangement, favorable mechanical properties are obtained when the strips are reinforced on one side by an additional strip such as one made of metal, that offers about the same resistance to the longitudinal distention as the opposite carrier plate. When the carrier plate consists of metal, it can be employed as a shared electrode for all the strips of the piezoelectric material.

The channel matrix can be manufactured in a simple manner by employing a bilaminar material consisting of carrier material and piezoelectric material. A strip structure is produced, for example, by means of incising or cutting the piezoelectric material. The strips may then be contacted at one side, and a cover plate applied as termination. Preferably every second channel is filled with an elastic material or with air.

In another embodiment, the construction of the print head is performed starting with a laminate of piezoelectric material provided with a metal layer on both sides, from which longitudinal channels are alternately cut beginning from opposite sides. The depth of the channels extends over a metal layer and the piezoelectric material. The channel plate manufactured in this manner may be terminated with a plate on at least one side. In this arrangement, the channel plate can be interrupted in a longitudinal direction by different layers, so that the tensile stress arising from application of an exciting voltage is not propogated throughout the structure. The mechanical stability of the overall arrangement is at the same time maintained.

These and other objects and advantages of the present invention will become manifest by an inspection of the following description and the accompanying drawings.

BRIEF DESCRIPTION OF THE DRAWINGS

Reference will now be made to the accompanying drawings in which:

FIG. 4 is a partial cross-sectional view showing the channel matrix of FIG. 3 in two different conditions;

FIG. 5 illustrates a cross-sectional view of an alternative embodiment of the channel matrix incorporating the present invention;

FIG. 6 is a cross-sectional view through a double channel matrix incorporating the present invention;

FIG. 7 is a longitudinal section through a channel; and

FIG. 8 is a perspective view of a write head having four channel matrices.

DESCRIPTION OF THE PREFERRED EMBODIMENTS

Figure 1:
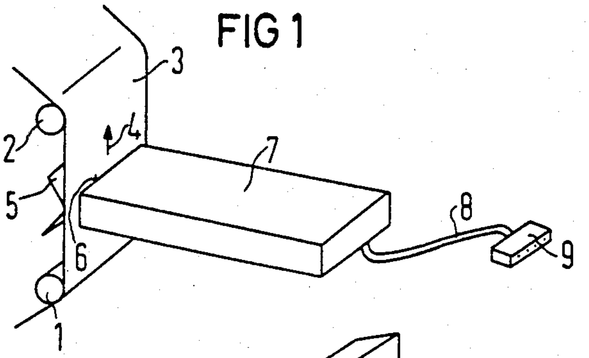
FIG. 1 is a schematic view of an ink jet printer incorporating the present invention.

Refering first to FIG. 1, a perspective view of an ink jet printer is illustrated. The recording medium 3 is preferably standard recording paper, and is drawn past the end face 6 of the housing 7 by means of transport rollers 1 and 2 in the direction of arrow 4, across a supporter spacer 5. A cable 8 is provided for making an electrical contact with the interior of the housing 7, and a plug 9 is provided at the free end of the cable 8 for connection to control means that supplies the control signals for recording the desired characters or images. The housing 7 contains the actual print head.

Figure 2:
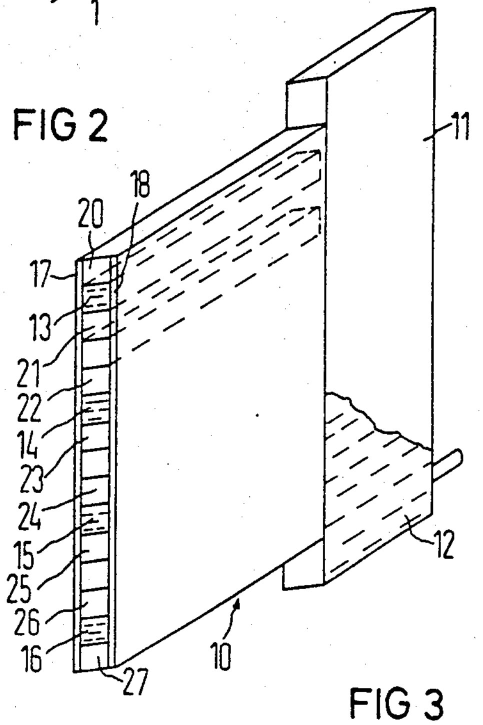
FIG. 2 is a perspective view of a print head incorporating the present invention.

FIG. 2 illustrates one possible embodiment of the print head 7. It consists of a channel matrix 10, connected with a reservoir 11 filled with ink or writing fluid 12. Ink channels 13 through 16 are indicated in the channel matrix 10 by broken lines, such ink channels being formed by two plates 17 and 18, and the strips 20 through 27 of piezoelectric material lying therebetween. For the sale of clarity, illustration of the electrical contacting of the piezoelectric strips has been omitted. The plate 17 can, for example, consist of metal and form a shared electrode for all shared strips 20 through 27 of piezoelectric material. The other side of the strips must then be contacted in pairs. When the plate 18 also consists of conductive material, insulation must be provided between the plate and the contacts.

Figure 3:
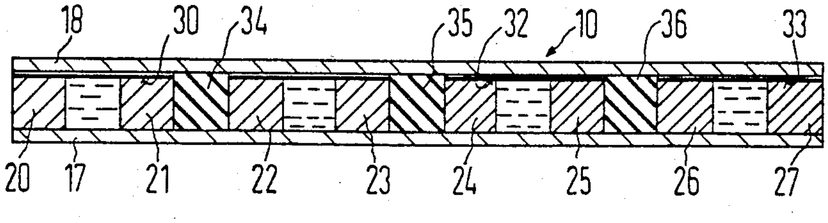
FIG. 3 is a cross-sectional view through a channel matrix incorporating the present invention.

FIG. 3 shows a cross-section through the channel matrix according to FIG. 2. A nickle foil serves as the carrier plate 17. The piezoelectric material 20–27 is applied in strip-like form. These strips are provided in pairs with electrical contacts 30 through 33. The termination is formed by the cover plate 18 that, in this case, consists of a non-conductive material. Every second channel 34 through 36 formed is filled with an elastic material, for example silicone rubber. When, for example, the width of the piezoelectric strips is about 50 μm and the spacing between the neighboring strips is the same, then there is a 200 μm spacing of the write nozzles (the hollow channels 13 through 16). Thus, five write nozzles per mm are provided, and a very good recording quality is attainable therewith. The thickness of the strips can be of approximately the same order. The length of the channel matrix is preferably about 10 mm, in order to obtain a sufficiently great ink ejection without voltage amplitudes that are too high. The thickness of the carrier plates 17 and 18 amounts to approximately 20 μm.

FIG. 4 shows an enlarged section of the illustration according to FIG. 3 in two different coditions. Solid lines indicate that condition in which a voltage has been applied to the two strips 20 and 21 of piezoelectric material, so that these strips become narrower and higher. Broken lines indicate that condition in which the strips of piezoelectric material have returned to their original shape. As seen from this illustration, the cross-sectional surface of the channel is enlarged during application of a voltage to the piezoelectric strips, and additional writing fluid is thus sucked into the channel. Upon removal of the voltage, the strips return to their original shape, thereby reducing the enclosed channel volume such that the writing fluid to be displaced is ejected as one or more drops at the front of the channel matrix.

FIG. 5 shows a cross-sectional view of another embodiment of a channel matrix 40. This essentially consists of a laminate of piezoelectric material 41 that is provided with a metal coating 42 and 43, respectively, at both sides. Channels 44 through 47 have been alternately introduced, for example by means of sawing, into this laminate, proceeding from both the upper side and the under side. In the present exemplary embodiment, the channels respectively extend across one metal layer and the layer of piezoelectric material. These channels need not necessarily extend through the entire layer of piezoelectric material. Every second channel can again contain air and be closed off relative to the reservoir.

A mechanically interconnected laminate is still obtained in the arrangement despite the incision of the channels. Since, in this arrangement, the strips of piezoceramic material are identically provided with a metal layer at both sides, i.e. they are reinforced in a certain sense, symmetrical conditions prevail upon application of a voltage to two strips so that the deformation of the piezoelectric element cannot produce a bending of the channel matrix 40. As shown, the termination is again formed by a plate 48 and 49 or alternatively, by only a single plate 49. This reinforcing can also be employed in the channel matrix shown in FIGS. 2–4, described with reference to the preceding exemplary embodiment. An advantage of this arrangement is that the electrical contacts can remain dry, i.e. they do not come into contact with the writing fluid.

The strips become practically narrower than otherwise as a result of preventing the expansion of the strips of the piezoelectric material in the longitudinal direction, due to reinforcement on the upper side of these strips. An effect that is about 30% greater can be achieved in this manner during application of the same voltage. Expressed in other words, the same effect can be achieved at a reduced voltage and, thus, with a reduced power requirement.

A further advantage of the channel matrix according to the exemplary embodiment of FIG. 5 consists in that the tensile stress in the longitudinal direction produced due to the deformation of the strips of piezoelectric material can be suppressed, by breaking the piezoelectric material at intervals along the longitudinal direction. The mechanical stability of the overall channel matrix is not changed as a result of the fine cross-fractures arising from such breaking, but stresses can no longer propagate in the longitudinal direction.

In another exemplary embodiment, again shown in a schematic cross-sectional illustration, FIG. 6 shows that two channel matrices 50 and 60 can be disposed closely packed in order, for example, to increase the resolution. For reasons of simpler illustration, only two channel matrices 50 and 60 are shown. If needed, a plurality of such single-row channel matrices can be united to form a block. As seen in FIG. 6, the center plate 51 is simultaneously employed as the cover plate for the upper and lower channel rows. When this plate 51 is formed of a conductive material, then a shared electrode for both the upper as well as for the lower strips of piezoelectric material results. In the example according to FIG. 6, the ink channels 52, 53 and 61 in the two rows are disposed in offset relation to one another. This has the advantage that enhanced resolution is obtained in a simple manner. It is only necessary that the two rows are driven at different times in accord with the relative speed between the print head and the writing paper. Also, different rows of ink channels may be supplied with different color writing fluids so that multi-colored recording is possible.

FIG. 7 shows an ink channel 70 in a longitudinal section. A part 73 of the piezo-electric material that reduces the height of the discharge opening may be seen at the right-hand end region next to the two cover plates 71 and 72. As a consequence, the ink channel 70 exhibits a larger volume and, therefore, a greater ink ejection without the size of the drops changing. Since only the height of the ink channels has been altered, the mutual spacing can continue to correspond to the resolution required.

FIG. 8 shows a print head 80 similar to that illustrated in FIG. 2, in which four tightly packed channel matrices 81–84, as well as four separate reservoirs 85–88 for different colors of writing fluid, are provided. When the colors red, blue, yellow and black are selected, then full color recordings can be produced, controlled, for example, by a still picture monitor.

From the foregoing, the present invention has been described in several embodiments. It will be apparent to those skilled in the art that various modifications and additions may be made without departing from the essential features of novelty thereof, which are intended to be defined and secured by the appended claims.

What is claimed is:

1. A piezoelectrically operated print head for a dot matrix comprising; printing nozzles in the form of ink channels each having drive elements, said channels accepting writing fluid from which the writing fluid is ejected drop-by-drop due to piezoelectric deformation of its drive element, said ink channels being formed as a channel matrix that consists of at least one series of strips of piezoelectric material that are disposed parallel to one another at spaced intervals, and including means for electrically contacting said piezoelectric material at both sides, and means for covering said strips at both sides.

2. A print head as claimed in claim 1, wherein the thickness of the strips and their mutual spacing are selected so that the channels located between the strips directly form the printing nozzles, whereby writing fluid is ejected directly from said channels in response to electrical excitation of said piezoelectric material.

3. A print head as claimed in claim 1, wherein only every second channel is employed as a printing nozzle.

4. A print head as claimed in claim 1, wherein the plate at one side of the piezoelectric strips consists of metal and serves as a shared electrode for all said strips.

5. A print head as claimed in claim 4, wherein at least this plate is so thin that the deformation of the piezoelectric strips causes no bending.

6. A print head as claimed in claim 1, wherein the piezoelectric strips are provided with a metal layer at their upper side.

7. A print head as claimed in claim 1, wherein the height of the ink channels decreases in the region of the discharge opening.

8. A method for manufacturing a print head including the steps of providing a carrier plate having a conductive layer on one surface, applying piezoelectric material to said conductive layer in strips, providing electrical contacts for contacting said piezoelectric strips in pairs, and providing an insulating plate for covering the side of said strips opposite said carrier plate for forming a plurality of closed channels.

9. The method for manufacturing a print head as claimed in claim 8, including the step of providing a bilaminar plate of carrier material and piezoelectric material for said carrier plate and said strips, the strip structure of said piezoelectric material being generated by selective removal of piezoelectric material.

10. The method as claimed in claim 8, including the step of providing metal as the carrier material.

11. The method for manufacturing a print head as claimed in claim 8, including the step of forming a laminate of piezoelectric material with a metal coating on both sides, cutting strips extending over approximately two layers alternately from the laminate on alternate sides and electrically contacting the remaining strips of piezoelectric material in pairs, and providing a cover plate in at least one side.

12. The method for manufacturing a write head as claimed in claim 11, including the step of breaking the piezoelectric material at least once in the longitudinal direction of said strips.

* * * * *